May 25, 1926.
L. S. KALLAJIAN
BRAKE FOR SCOOTERS
Filed Oct. 23, 1924
1,586,041
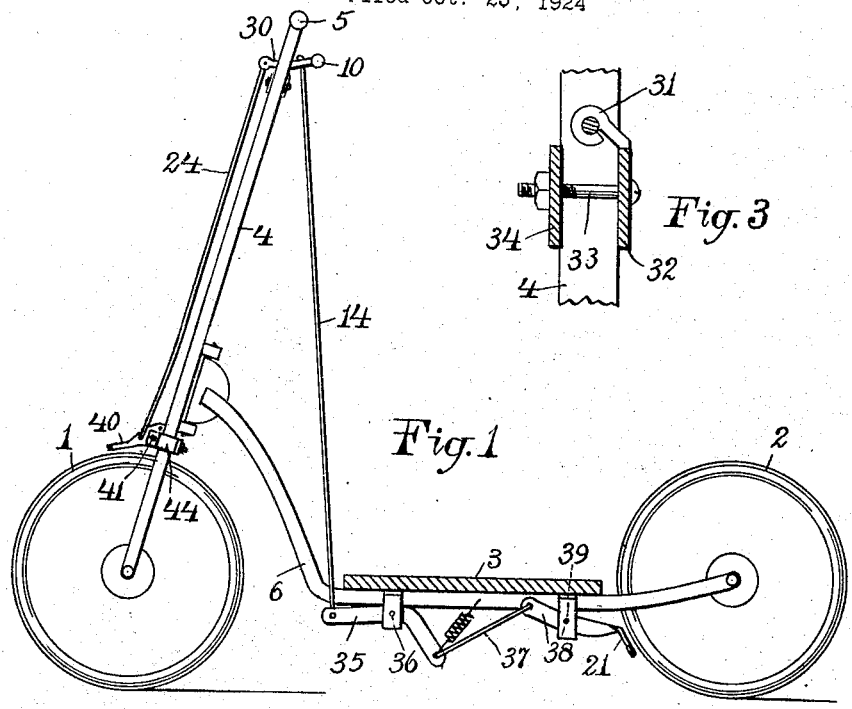
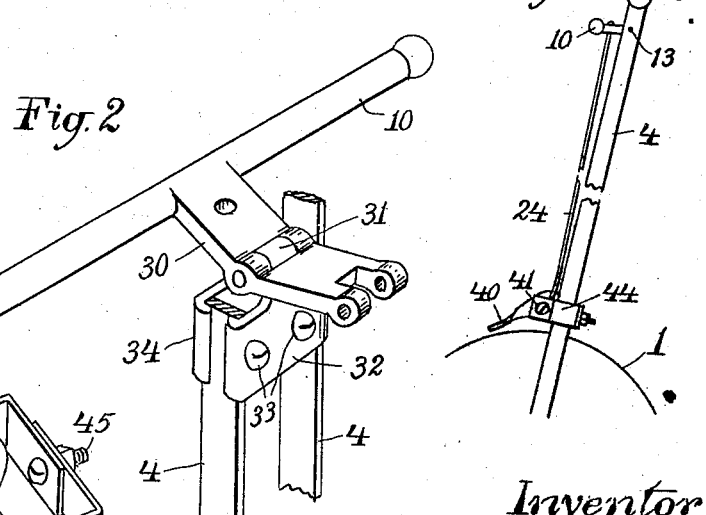
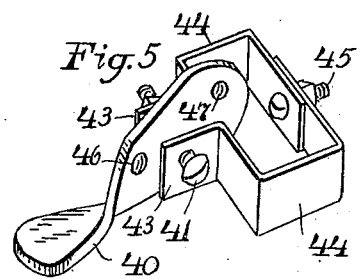
Inventor,
Lazarus S. Kallajian,
By
A. Bluham,
Attorney.

Patented May 25, 1926.

1,586,041

UNITED STATES PATENT OFFICE.

LAZARUS S. KALLAJIAN, OF BOSTON, MASSACHUSETTS.

BRAKE FOR SCOOTERS.

Application filed October 23, 1924. Serial No. 745,363.

This invention has for its object the construction of an inexpensive and easily controlled brake for children's two-wheeled vehicles known as scooters.

These scooters are constructed with a pair of tandem wheels having a horizontal board supported thereby, one of the wheels having a steering post and handle bar for its control. Heretofore, attempts have been made to provide brakes for such scooters operated by pressure of a foot, but as it is quite essential that a child shall stand with both feet securely upon the board in order to avoid danger of accident, these have not been successful. I have consequently sought to devise a brake which might be operated by the hand or hands of the child and without removing either hand from the handle bar. To this end, I have arranged an auxiliary bar beneath and parallel with the handle bar, and so connected with a braking device that an upward pull thereon by the thumbs or finger-tips will operate it without disturbing the position of the hands upon the handle bar.

In the drawings forming part of this specification, Fig. 1 is a side elevation of a scooter provided with a brake embodying one form of the invention. Fig. 2 is a perspective view of parts thereof. Fig. 3 is a cross section showing a detail of my preferred form of pivotal device. Fig. 4 illustrates another form of my brake. Fig. 5 is a perspective view of one of the brake members.

The scooter comprises two wheels 1 and 2 arranged tandem a board 3; a steering post 4 having a handle bar 5, and ribs 6 on which the board is fastened and between the rear ends of which the wheel 2 is mounted. The front ends of the ribs are swiveled between the two members of the steering post; all in a well known manner.

Spaced below the handle bar 5 and parallel therewith is an auxiliary bar 10 having a neck 30 pivotally supported between the post members 4. While the pivotal means can consist of a rivet 13 passed directly through the bars 4, as illustrated in Fig. 4, I prefer to have the same removably attached to the post without any alteration in the latter. For this purpose, an eye 31 is formed as a part of a plate 32 which is clamped to the post by means of bolts 33 and an oppositely disposed plate 34.

The neck 30 is operatively connected by means of a rod 14 and intermediate parts to a brake 21 arranged for the rear wheel 2, such parts consisting preferably of a bellcrank lever 35 pivotally supported at 36 and connected by a wire rod 37 to a lever 38 pivotally supported at 39. When the bar 10 is drawn upward, the brake shoe 21 is pressed against the wheel 2 and the motion of the scooter retarded accordingly.

In addition to the brake shoe 21, I prefer to provide the front wheel 1 with a brake shoe also. This brake 40 is suitably pivoted to the post 4 close above the wheel 1, and is pressed into contact therewith by a rod 24 whose upper end is pivotally attached to a prolongation of the neck 30, so that as the bar 10 is drawn upward, the brake shoe 40 is pressed downward.

As indicated in Fig. 4, I may dispense with the brake shoe 21, and locate the bar 10 in front of the post 4, having the front brake shoe 40 pivotally supported at 41, and connecting the rear end of the brake to the neck 30 by a wire rod 42, whereby an upward pull given to the bar 10 causes the brake shoe 40 to be pressed against the wheel 1. The means for pivotally supporting this shoe 40 without requiring any drilling of the post members 4 is illustrated in Fig. 5. The pivot bolt 41 acts also to press toward each other the elbows 43 of the U-shaped clamps 44, whose opposite ends overlap and are secured together by a bolt 45. The shoe 40 is formed by partially twisting a length of flat bar metal and providing it with two eyes 46, 47 at opposite points from the pivot 41. This enables the shoe to be actuated either by the rod 24 pressing it downward by attachment in the eye 46, or by a wire rod 24 pulling upward and attached to the eye 47.

For increased safety in descending steep hills, I prefer to supply the scooter with both the brake 21 pressing against the rear wheel, and the brake 40 pressing against the front wheel, thus providing a double braking means for slowing down the scooter.

What I claim as my invention, is:

1. The combination with a scooter having tandem wheels, a steering post, and a straight handle bar transverse to the line of the scooter's travel, of a brake comprising a straight auxiliary bar spaced below said handle bar and parallel therewith, and a brake shoe for one of said wheels connected with said auxiliary bar, said auxiliary bar being pivotally supported at its midlength by said steering post to move on an axis parallel with itself and projecting beyond both sides of said handle bar, whereby the youth operating the scooter can use both hands equally and simultaneously in braking the same.

2. The combination with a scooter having tandem wheels, a steering post composed of two spaced parallel bars, and a handle bar, of an auxiliary bar having a neck pivotally supported between said parallel bars, a brake shoe for one of said wheels, and connections including a slender rod attached to said neck for enabling said auxiliary bar to operate said brake shoe.

3. The combination with a scooter having tandem wheels, a handle bar and a steering post composed of two spaced parallel bars, of an auxiliary bar having an apertured neck, a plate having an eye pivoted in said aperture, a second plate, bolts clamping said plates to said bars, a brake shoe, and connections between said neck and brake shoe.

In testimony that I claim the foregoing invention, I have hereunto set my hand this 14th day of September, 1924.

LAZARUS S. KALLAJIAN.